United States Patent
Schaafsma et al.

(10) Patent No.: US 8,506,671 B2
(45) Date of Patent: Aug. 13, 2013

(54) COATED FERTILIZER

(75) Inventors: Stefan Hendrikus Schaafsma, Sittard (NL); Richard Johannes Matheus Janssen, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 385 days.

(21) Appl. No.: 12/747,361

(22) PCT Filed: Dec. 12, 2008

(86) PCT No.: PCT/EP2008/067441
§ 371 (c)(1),
(2), (4) Date: Sep. 16, 2010

(87) PCT Pub. No.: WO2009/074679
PCT Pub. Date: Jun. 18, 2009

(65) Prior Publication Data
US 2011/0000268 A1    Jan. 6, 2011

(30) Foreign Application Priority Data

Dec. 13, 2007  (EP) .................................. 07024216

(51) Int. Cl.
| C05F 11/00 | (2006.01) |
| C05F 11/02 | (2006.01) |
| C05F 7/00 | (2006.01) |
| C05F 5/00 | (2006.01) |
| A01N 25/00 | (2006.01) |

(52) U.S. Cl.
USPC ............ 71/25; 71/23; 71/24; 71/26; 71/64.02

(58) Field of Classification Search
USPC .................................. 71/1–30, 64.01–64.13
See application file for complete search history.

(56) References Cited

U.S. PATENT DOCUMENTS

2006/0128816 A1 *  6/2006  Cheng et al. .................... 516/56

FOREIGN PATENT DOCUMENTS

| CN | 101054314 | 10/2007 |
| EP | 1 538 197 | 6/2005 |
| GB | 2 305 914 | 4/1997 |
| JP | 03152298 A * | 6/1991 |
| WO | WO 03/009710 | 2/2003 |
| WO | WO 2008/000492 | 1/2008 |

OTHER PUBLICATIONS

International Search Report for PCT/EP2008/067441, mailed Jun. 18, 2009.
The First Office Action, SIPO, People's Republic of China, Appln. No. 20880126754.2, Dec. 4, 2012.

* cited by examiner

Primary Examiner — Kaj K Olsen
Assistant Examiner — Jennifer Smith
(74) Attorney, Agent, or Firm — Nixon & Vanderhye P.C.

(57) ABSTRACT

Coated fertilizer wherein the fertilizer and animal feed comprises particles coated with a biomass composition comprising 5-35 wt. % solid biomass particles with a $D_{50}$ between 0 and 250 μm and a $D_{90}$ of less than 400 μm and 95-65 wt. % oil, a biomass composition wherein the biomass composition comprises solid biomass particles with a $D_{50}$ between 0 and 250 μm and a $D_{30}$ of less than 400 μm and a process for the production of a biomass composition wherein a biomass composition comprising solid particles having a $D_{50}$ between 100 and 1000 μm is filtrated and the residue is grinded until the solid particles have a $D_{50}$ between 0 and 250 μm and a $D_{90}$ of less than 400 μm.

14 Claims, No Drawings

# COATED FERTILIZER

This application is the U.S. national phase of International Application No. PCT/EP2008/067441 filed 12 Dec. 2008, which designated the U.S. and claims priority to EP Application No. 07024216.9 filed 13 Dec. 2007, the entire contents of each of which are hereby incorporated by reference.

The invention relates to a coating for fertilizers and in particular biodegradable coatings which exhibit good anti-caking properties.

Various fertilizers are known and also various agents to coat the particles thereof. Fertilizers and coatings for fertilizers are for instance described in Ullmann's Encyclopedia of Industrial Chemistry, 2002 in the chapter about Fertilizer Granulation.

According to this publication a coating is applied to a fertilizer to promote the maintenance of good physical conditions, like the flowability, during storage and handling. The coating agent does not improve the fertilizing properties of a fertilizer. It is therefore, according to Ullmann, preferable to use other means, such as good drying, to avoid caking of the fertilizer particles. Caking is the agglomeration of fertilizer particles by adhesion at their point of contact to form a compact mass that is difficult to break up. Caking has a negative influence on the flowability of a fertilizer.

A disadvantage of the known coating agents for fertilizers is that these coating agents after the field application of the fertilizer stay in the soil and accumulate there, because the known coating agents are slowly degradable. Therefore, the known coating agents are harmful for the environment. Although disadvantage of conventional coating is that they often contain highly purified and processed compounds, many of which are synthetic, which possess a high carbon footprint and thus are environmentally unsustainable.

An object of the invention is to overcome at least some of the above disadvantages, by providing a biomass composition for coating fertilizers and animal feed which is environmentally friendly in terms the composition's biodegradability and/or the composition's utilization of waste materials.

In one embodiment of the present invention there is provided a biomass composition for coating on a fertilizer particle or animal feed particle comprising, relative to the total dry weight of the composition:
 a. 5-35 dry wt % biomass solid particles with a $D_{50}$ between 0 and 250 μm and a $D_{90}$ of less than 400 μm; and
 b. 95-65 dry wt % dispersant,
wherein, the dispersant comprises an oil, fat or wax or combination thereof.

The biomass composition provides an effective means to coat fertilizer and animal feed particles, such that resultant particles have good flowability, with the residual coating readily absorbed into the environment. The biomass composition comprises solid biomass particles which have a particle size distribution such that the $D_{50}$ is preferably less than 180 μm, more preferably less than 90 μm, even more preferably less than 45 μm and most preferably less than 10 μm. The smaller the particles are the better the coating capabilities of the biomass composition are. In another embodiment, the biomass particle size ($D_{50}$) is at least 5 μm, more preferably at least 10 μm, even more preferably at least 25 μm and most preferably at least 100 μm. It has been found that despite a courser biomass particle size, good anti-caking performance may be achieved, thereby enabling a less processed biomass to be used and resulting in less hazardous fine dust formation.

The particles in the biomass composition preferably have a $D_{90}$ less than 300 μm, more preferably less than 150 μm, even more preferably less than 100 μm, and most preferably less than 50 μm. The difference between $D_{50}$ and $D_{90}$ is preferably less than 200 μm, more preferably, less than 150 μm, and even more preferably less than 50 μm. Through minimizing the proportion of larger particle components and/or using a narrow particle size distribution, the biomass composition is able to form a more stable slurry suspension. This is important to ensure that the biomass composition has a homogeneous composition such that the coated particles exhibit a consistent anti-caking performance.

Dispersant.

The dispersant comprises, and preferably essentially consists of, oil, fats or waxes and combinations thereof. Oil, fats and waxes are substances which each take on an "oily" state depending upon the temperature. The dispersant is preferably an oil, fat or wax which is in a liquid state ("oily") at the temperature of application of the biomass composition onto the fertilizer or animal feed particle. Oil, fat or wax are hydrophobic (immiscible with water) and lipophilic (miscible with other oils, fats and waxes in the liquid state).

Preferably, each of the components of the dispersant is liquid at 85° C., preferably 75° C. and more preferably 65° C. and even more preferably 55° C. The lower the melting points of each of the components, the more readily the biomass composition will be able to be applied to the fertilizer or animal feed particles. Preferably, the biomass composition is a shear thinning suspension, such that the viscosity of the suspension decreases as shear forces are applied, either through agitation or pumping the suspension under pressure through piping. Additives which increase the yield stress of the composition to promote a stable suspension may be added, such as a maleic anhydride modified olefinic copolymers, including maleic anhydride modified ethylene propylene copolymers, Bondyram 7003 available from Polyram U.K. Ltd, Ricobond 1031 available from Sartomer Europe, and MAh-polymers such as polyisobutylene-g-MAh (PIBSA).

Preferably, the viscosity of the dispersant has a low enough viscosity to enable spraying of the biomass composition onto the fertilizer or animal feed particles at an application temperature of 50° C. or 60° C. (i.e a biomass composition viscosity at the application temperature of less than 700 cP, preferably less than 400 cP and more preferably less than 200 cP). The dispersant functions as a water barrier to prevent the transfer of moisture between coated particles, when the biomass composition is applied as a coating. The transfer or absorption of moisture by the particles may lead to agglomeration of particles which is detrimental to solid particle flow and therefore the efficient transport and distribution of the fertilizer or animal feed particles.

The oil, fats and wax used in the biomass composition may be a natural oil, fat or wax, a mineral oil, fat or wax or a synthetic oil, fat or wax.

A natural oil or fat originates from a natural source, for instance plant derived oil or fat (such as vegetable oils and fat), animal oils or fats and fish oils and fats. Examples of vegetable oils are sesame oil, corn oil, soy oil, castor oil, peanut oil, cole seed oil, palm oil, coconut oil, sunflower oil, cotton seed oil, linseed oil, arachidic oil and olive oil. A mineral oil is a product in the distillation of crude oil and is normally a mixture of various fractions. A synthetic oil is an oil specifically prepared for a certain purpose starting from carbon dioxide, methane and/or carbon monoxide using, for instance, a Fisher-Tropsch process. Also a mixture of any of the above-mentioned oils may be used.

Preferably, the dispersant comprises at least 50 wt % of natural oil, wax and/or fat, more preferably at least 70 wt %, even more preferably at least 90 wt % and most preferably at least 99.5 wt %, relative to the total weight of the dispersant. The higher the natural oil, wax and/or fat the more biodegradable and environmentally friendly the dispersant.

To maintain good anti-caking performance over time, a proportion of mineral oil, wax or fat may be added to the dispersant composition. In this embodiment, the dispersant composition comprises at least 10 wt %, more preferably at least 30 wt %, even more preferably at least 50 wt % and most preferably at least 80 wt % mineral oil, wax or fat relative to the weight of the total composition. Within this embodiment, the balance of the dispersant is preferably a natural oil, wax or fat.

As indicated, the dispersant may partially or fully comprise waxes, which preferably have a melting point of less than about 85° C. Waxes may be derived from natural (animal or vegetable), mineral, petroleum or synthetic origins. Preferably, the waxes are vegetable waxes, such as sunflower wax or a petroleum wax, such as paraffin based waxes. In some embodiments, the oil comprises at least 20 wt % wax, more preferably at least 40 wt % wax, even more preferably at least 50 wt % wax and most preferably at least 70 wt % wax, relative to the total weight of the dispersant. Increased wax content increases the water barrier properties of the composition and reduces the "stickiness" of the coating and thus improves flowability.

Fats are defined as oils which are solid at room temperature and therefore include tallow, lard and vegetable shortening such as palm stearate or hydrogenated oils, such as hydrogenated soybean oil.

Preferably, the dispersant comprises (and preferably consists of) a natural dispersant, because a biodegradable oil, fat or wax based coating will be generally more biodegradable compared to dispersants consisting of mineral or synthetic dispersants.

More preferably, the oil is a plant derived oil and the biomass solid particles are plant derived, such that coating substantially consists of plant derived components.

Preferably, the biomass composition comprises at least 70 dry wt % and more preferably at least 80 dry wt %, even more preferably at least 90 dry wt % and most preferably at least 95 dry wt % biomass solid particles and dispersant relative to the total dry weight of the biomass composition.

Plant derived oil include any oil derived from a plant variety and in particularly comprises edible oil derived from sunflower seed, rapeseed, safflower seed, soybean, linseed, mustard seed, peanut, cottonseed, corn, palm. Alternatively, in-edible oilseeds, such as karanj, mahua, neem or castor may also be suitable. Preferably, the plant derived oil is derived from rapeseed oil, due to its general availability, low viscosity and relatively good thermal oxidative stability.

Unexpectedly it has been found that the use of crude plant derived oil produces improved results compared to oil which has been refined and deodorized (R&D). Crude oil is typically produced via a two step process in which the plant containing oil, such as oilseeds, are pressed typically at elevated temperatures to extract the oil from the seed. To ensure that the maximum oil content is extracted from the seeds, the pressed oilseeds or oilseed meal, is then washed with a solvent, such as hexane to remove the residue oil from the oilseed meal. Crude oil typically contains a variety of phospholipids (up to about 2.5 wt %), waxes (up to about 1 wt %), sterols, tocopherols and other trace components which are removed substantially removed during the degumming, bleaching, deodorization and de-winterization steps which the R&D oil is subjected to. Depending upon the degree of filtering, the crude oil may also contain up to 5 wt % biomass solids in the form of oilseed meal. It is suspected that there is synergistic interaction between the crude vegetable oil and biomass solid particles which contribute to the improved performance of this combination of components.

Crude oil also includes cold pressed oil which is processed through cold pressing the oil, as the name suggests. This process removes less oil from the plant material, although the gentler processing conditions produce an oil and oilseed meal of a lighter colour which is reflective of the lower degree of degradation of organic matter. Cold pressed oil also generally has a low phospholipid content compared to crude oil extracted using hot pressing and/or solvent extraction techniques. Due to the lower degree of degradation cold pressed oil and oilseed meal is generally more stable than oil and oilseed meal produced through hot pressing and/or solvent extractions techniques. The acid value of the oil is an indication of the % free fatty acids in the oils, which is a degradation product of the oil. While, the acid value can vary depending upon a variety of seasonal, storage and processing conditions, cold pressed oils typically have a lower acid value than crude vegetable oil which has been subjected to high temperature and solvents. Preferably, the acid value of the oil (dispersant) is less than 10 mg KOH/g (Test method: AOCS Cd3a-63), more preferably less than 6 mg KOH/g and most preferably less than 2 mg KOH/g. The lower the acid value of the oil (dispersant), the less corrosive the oil (dispersant) is on processing and storage equipment.

An additional advantage of crude vegetable oil is that it contains natural antioxidants, such as tocopherols, which slow further thermal oxidative reactions which lead to an increase in the acid value. While R&D oils initially have a low acid value, as the free fatty acids have been distilled from the oil, they tend to be more prone to thermal oxidative reactions, which increase the acid value over time. Antioxidants, preferably natural antioxidants, may be added to the oil to further stabilize the biomass composition from thermal oxidation.

Crude Oil Components

Wax.

In general, wax is a collective term for a group of compounds that contain long-chain fatty acids esterified with a fatty alcohol, with total carbon chains generally ranging from about 20 to about 44 carbons in length. Waxes have melting points of at least 40° C. In general, plants synthesize waxes for use as barriers to moisture evaporation and penetration. Suitable plant-derived waxes include, for example, sunflower oil wax (*Helianthus annuus*), rice bran oil wax, and corn oil wax. Hydrogenated jojoba oil also is a suitable plant-derived wax.

Crude sunflower oil typically contains up to about 1 wt % of wax, but may contain up to 3 wt. % depending on the variety and on growing and processing conditions. The wax content of crude sunflower oil is dependent on the dehulling process, as sunflower wax is thought to originate from wax deposited on seed hulls. Purified sunflower oil wax has a melting point of about 70° C. to about 80° C., and is primarily composed of long chain saturated fatty acid hydrocarbons and long chain alcohols.

Due to the high melting point of waxes, oils containing waxes can take on a "cloudy" appearance, particularly during cooler periods of the year on it cooler geographic locations. To lower the viscosity of the biomass composition to aid the coating process, the waxes may be reduced or removed from the oil through cooling the filtering the precipitated waxes, a process known as de-winterization.

Phospholipids.

Phospholipids is the term given to oil derivatives in which one fatty acid has been replaced by a phosphate group and one of several nitrogen-containing molecules. The charges on the phosphate and amino groups make that portion of the molecule hydrophilic. The result is an amphiphilic molecule.

While the phospholipid content of the biomass composition may act to form a stable suspension, especially with plant derived solid particles, due to its hydrophobic and hydrophilic functionality, the phospholipids also tend to absorb moisture from the atmosphere and form a hydrated lecithin gum. Over prolonged storage period (i.e several weeks or months), the lecithin gum settles to the bottom of the storage vessel and forms a viscous sludge material, which may adversely affect the coating operation. To avoid the formation of excessive lecithin gum, the crude oil may be water degummed to remove the majority of the lecithin gums. The degumming operation is a conventional technique used to the processing of crude vegetable oils to R&D oil, in which water is added to the crude oil, thereby converting the phospholipids into a hydrated water/oil emulsion known as lecithin gum. If required, small amount of acid (eg. phosphoric or citric) may be added to the water during the degumming operation to further enhance the removal of lecithin gums.

Waste Oilseed Processing Streams.

In a special embodiment of the present invention, greater than 0 wt % and less than 80 wt %, and preferably between 1 wt % and 50 wt %, of the total weight of the biomass composition is derived from one or more agricultural waste processing streams, preferably comprising one or more oilseed waste processing streams. Waste process streams include, but are not limited to oilseed dusts and fines, lecithin wet gum, lecithin, soapstock, waste bleaching earth, wax and deodorizer distillate or a combination thereof.

The waste bleaching earth, such as acid activated clays, typically contains inorganic particulates within the desired particle size distribution and hence this low value waste may be conveniently used to supplement the biomass solids. Similarly, the use of oilseed fines or dust or other agricultural dust (eg. wheat dust or fines), which require minimal or no further particle size reduction may be advantageously used to minimize processing costs.

The various waste streams provide a crude source of anti-oxidants, amphiphilic components (lecithin or lecithin wet gums) and stable hydrophobic components (waxes) which may be used to adjust the desired properties of the biomass composition. For instance, in biomass compositions with high biomass loading, lecithin may be added up to 10 wt % relative to the total weight of the biomass composition to promote better mixing of the polar and non-polar components of the biomass composition.

Other agricultural waste streams include wood and paper derived biomass (e.g. wood or paper dust) and waste products from animal processing (eg. bone meal or other fauna derived biomass source).

In a special embodiment of the present invention, the dispersant essentially consists of, relative to the total weight of the total dispersant:

0 to 100 wt %, preferably greater than 75 wt % to less than 99.9 wt % oil; more preferably 75 wt % to 98 wt % oil and more preferably greater than 80 wt % to less than 95 wt % oil.
  0 to 60 wt %; preferably 0.1 wt % to less than 25 wt % wax; and more preferably greater than 1 wt % to less than 20 wt % wax.
  0 to 60 wt % fat; preferably 1 wt % to less than 30 wt % fat; and
  0 to 20 wt, preferably 0.1 wt % wt to less than 10 wt % phospholipids, and more preferably greater than 1 wt % to less than 8 wt % phospholipids.

A dispersant high in oil (mineral, synthetic or natural) and supplemented by waxes and/or phospholipids exhibits a good balance between stable hydrophobic properties (wax) and the ability to form a stable suspension with solid biomass particles (phospholipids), which may be readily applied (oil/fat) as a coating to the surfaces of a fertilizer or animal feed particle.

Biomass Solid Particles.

The biomass solid particles are preferably plant derived solid particles, which are preferably oilseed meal, although small particles of any vegetable source (eg. grains) may be suitable, including fibres, scrap meal or flour, such as flour of wheat, barley, legumes, coconut or alfalfa. The oilseed meal is preferably derived from the same oilseeds used to derive the oil component of the biomass composition, such that the coating biomass composition may be produced within the same oilseed processing facility, thus reducing transport and storage costs.

The oilseeds meal is typically high in protein (about 10 to 30 wt %) and thus this source of biomass not only degrades into the environment, but may also contribute to the efficacy of the fertilizer (although any contribution will be relatively small). Similarly, when the biomass composition is used to coat animal feed, the plant derived oil contributes to the energy value of the animal feed, while the plant derived solid particles contribute to the protein content of the animal feed.

Preferably, the biomass solid particles are rigid, such that the particles may be ground into the target particle size distribution. Preferably, the oilseed meal is substantially free of husks or other fibrous material which is difficult to grind to the target particle size range. Ground de-hulled rapeseed has been found to be particularly effective within the scope of the present invention. Additionally, the biomass solid particles should have a relatively low moisture and moisture uptake rate. For example the initial moisture of the biomass solid particles (at 25° C. and 50% relative humidity) are preferably less than 30 wt. %, more preferably less than 20 wt. %, even more preferably less than 12 wt. % and most preferably less than 5 wt. %. Biomass derived from grains and/or legumes generally conform to the requirements of good mechanical and moisture absorption properties and, as such, are preferred compared to biomass derived from yeast or fungi which have less suitable mechanical and water absorption properties.

Examples of dispersants which may be added to stabilise the biomass composition suspension include alkyl sulfates, alkylsulfonates, alkyl phosphates, alkylbenzenesulfonates, such as lauryl sulfate, stearyl sulfate, dodecylsulfonates, octadecyl sulfates or dodecylsulfonates, condensation products of fatty acids and taurine or hydroxyethanesulfonic acid, alkoxylation products of alkylphenols, castor oil rosin esters, fatty alcohols, fatty amines, fatty acids and fatty acid amides, reaction products of nonylphenol and relatively short-chain substituted alkylphenols, and their polymeric derivatives, e.g. formaldehyde condensation products, and polymeric compounds, such as, e.g., polyacrylates, and their alkoxylates.

The biomass composition has 5 to 35 wt % biomass solid particles relative to the total weight of the biomass composition. At least 5 wt % biomass solid particles are required to obtain improvements in anti-caking and dust suppressant properties, while solids concentration above 35 wt % tend to spread unevenly over the fertilizer particle or animal feed particle and hence the resultant coated fertilizer particles or coated animal feed particles tend to have reduced anti-caking performance. However, depending upon the biomass, dispersant combination biomass levels may exceed 35 wt %, eg. at least 40 wt %, more preferably at least 45 wt. % and most preferably at least 50 wt. %, relative to the total dry weight of the biomass coating. The upper limit will be dictated by the anti-caking performance of the biomass coating.

The biomass solids content, such as plant derived solid particles may be measured by their hexane insoluble content which therefore excludes, oil and other hexane soluble material such as phospholipids. Alternatively, biomass solid contents may be derived by difference, after the oil (hexane soluble) and moisture (analyzed by Karl Fischer technique), components are calculated. The solids are preferably non-elastic, such to enable efficient and effective grinding of the biomass to the desired particle size range. The de-oiled oilseed meal typically contains 1 to 15 wt % residual oil and 5 to 15 wt % moisture relative to the total weight of the de-oiled oilseeds, depending upon the oil extraction means used. The determined % wt oil will be inclusive of other hexane soluble material such as waxes and phospholipids. Separate analysis of these oil miscible components may be performed using standard industry techniques. Standard industry techniques include those published by the American Oil Chemist's Society (AOCS).

The solid biomass particles may also be sourced from:
1. biomass of yeast cells, bacteria cells or fungi cells, and/or
2. waste water sludge resulting from the treatment of organic and/or biologic waste.

A biomass composition of the first group can, for instance, be either the microorganisms as such or the fraction of yeast cells, bacteria cells and/or fungi cells which is insoluble in water and which is obtained by opening of yeast cells, bacteria cells and/or fungi cells by a physical, mechanical, chemical or enzymatic method (or a combination of two or more of these methods) with consequent release of the content of the yeast cells, bacteria cells or fungi cells and by recovering the insoluble fraction. The microorganisms are preferably biologically inert.

Any yeast may be used as the starting material for the biomass composition. Examples are brewers yeast, wine yeast, bakers yeast and torula yeast. In embodiments which require relatively high biomass loading in the coating (i.e. 20 wt % or greater, yeast is not preferred due to the increase in viscosity which makes the dispersant difficult to apply evenly, thereby leading to a deterioration in anti-caking performance.

More specific examples are *Saccharomyces cerevisiae, Saccharomyces pastorianus, Sacchromyces rouxii, Sacchromyces carisbergensis, Sacchromycespombe, Candida utilis, Candida tropicalis, Candida lipolytica, Candida flayeri, Candida boidinii, Kluyveromyces* and *Rhodotrura minuta*. These yeasts can be used alone or in combination.

As bacteria any bacteria may be used as the starting material for the biomass composition. Examples are *Bacillus subtilus* and *E-coli*.

As fungi any fungi may be used as the starting material for the biomass composition. Examples are *Aspergillus Niger* and *Penicillinum Crysogenum*.

More particular a biomass composition of the second group can be, for instance, waste water sludge from fermentation processes; like the waste water sludge from the citric acid production, waste water sludge from the treatment of municipal waste, waste water sludge from agricultural processes; like the potato, sugarbeet and sugarcane industries.

The biomass composition comprises solid biomass particles, which are insoluble, and can, for instance, be obtained after cells are opened and their content is removed.

Recovery of the insoluble fraction may e.g. be performed by a solid-liquid separation method such as centrifugation or filtration, optionally followed by washing the solid fraction with water and/or squeezing and/or extrusion and/or drying of the solid fraction according to standard drying techniques.

Physical, mechanical, chemical or enzymatic methods for opening of the cells are known in the art. Opening by a chemical method may e.g. occur by treatment with salts, alkali and/or one or more surfactants or detergents. Opening by physical method may e.g. occur by heating, e.g. by boiling or autoclaving the cells. Opening by mechanical method may e.g. be performed by using homogenisation techniques. To this purpose, use of high-pressure homogenisers is possible. Other homogenization techniques may include mixing with particles, e.g. sand and/or glass beads, and the use of a milling apparatus (e.g. bead mill). Opening of the cells by an enzymatic method (enzymatic hydrolysis) may be performed by subjecting a suspension of the cells to the action of native enzymes and/or added exogenous enzymes, such as proteases, nucleases and glucanases. The conditions to perform enzymatic hydrolysis are dependent on the type of enzyme used and can be easily determined by those skilled in the art.

Depending on the nature and source of the biomass the biomass particles typically have a particle size with a $D_{50}$ between 100 and 1000 μm, although even larger particle size diameters may result when the raw material includes oilseed hulls and husks (eg. $D_{50}$ of 5000 μm).

When the solid biomass particles in the biomass composition have a $D_{50}$ smaller than 250 μm the biomass composition can be used as such as a coating agent. When the $D_{50}$ of the solid biomass particles is higher than 250 μm the particles need to be reduced in size.

This can be done by grinding with for instance a pin mill, a ball mill, a homogenizer, a rotor-stator mixer (e.g. an Ultraturrax) or by the use of a high-pressure homogenizer (e.g. a Microfluidizer). Combinations of these grinding methods can also be used.

Before grinding the biomass composition, that can contain water, can be filtrated and dried partly or totally. It is also possible to add (more) water or an other liquid, preferably an oil, to the biomass composition before grinding. A combination of drying the biomass composition and the addition of another liquid other than water, preferably an oil, before grinding is preferred. The addition of further oil facilitates the grinding process, while providing an inert grinding environment, thereby minimizing thermal oxidation of the biomass composition. Preferably, the biomass composition comprising at most 25 wt %, preferably at most 15 wt % and even more preferably at most 10 wt %, of water is dispersed in oil and is thereafter grinded.

The biomass composition may comprise other ingredients, such as liquids, fillers and coating agents other than the solid biomass particles. The liquids can be used to disperse the solid biomass particles. Examples of liquids are water, alcohols and oils. Examples of fillers are talcum, lime, kaolin and kieselguhr. Examples of other coating agents are waxes, fatty amines, paraffines, sulfonates, aldehydes or urea-aldehyde resins.

The biomass composition is preferably stored in conditions similar to that recommended for crude vegetable oil (i.e. in a cool, dry, place, out of direct sunlight and preferably under an inert atmosphere, such as carbon dioxide or nitrogen). The elimination of water, UV light, heat and oxygen serve to minimize thermal oxidative degradation and thereby extend the shelf life and performance of the biomass composition.

The above described biomass composition is used as a coating of the fertilizer or animal feed, which largely biodegradable and is not harmful for the environment.

Coated Fertilizers

In a second embodiment of the second invention, there is provided a coated fertilizer comprising fertilizer particles coated with the biomass composition as previously described.

A fertilizer that can be coated with the biomass composition is a solid fertilizer comprising particles with a typical diameter of 0.5-10 mm; in particular with a diameter of 1-5 mm.

Examples of fertilizers are calcium nitrate, ammonium nitrate, calcium ammonium nitrate (CAN), ammonium sulfate nitrate, ammonium sulfate, urea, superphosphate, triple superphosphate, monoammonium phosphate, diammonium phosphate, ammonium polyphosphate, nitrophosphate, potash, potassium phosphate, potassium nitrophosphate, NPK fertilizers and combinations of these fertilizers. These fertilizers can be produced by granulation, prilling and flaking.

Preferably, the fertilizer is granular urea or calcium ammonium nitrate (CAN), because these fertilizers are produced and utilized in large quantities and caking during storage and transport is, for these fertilizers, a big problem.

Coated Animal Feed.

In a third embodiment of the present invention, there is provided a coated animal feed comprising feed particles coated with the biomass composition as previously described.

The animal feed includes granules and pellets and other particulate forms of animal feed, which are used and known within the commercial livestock industry. The granules and pellets have a typical diameter of 1-50 mm; and in particular 2 to 20 mm.

Coated fertilizers and animal feed as described above can be prepared according to various processes. To prepare the coated fertilizers according to the invention the biomass is used as such or is grinded until it has a $D_{90}$ smaller than 400 µm. If the solid biomass particles in the biomass are too big the coating capability of the biomass composition is less, which results in more caking of the fertilizer particles.

The coated fertilizer can be produced by addition, for example by spraying or dripping, the biomass composition on the fertilizer in, for instance, a pan granulator, a rotating drum or a fluid bed apparatus. Preferably, the coated fertilizer or animal feed particle comprises 0.001-10 wt. % coating based on the total weight of the particle; more preferably, 0.1-1 wt. %. Preferably, the coating comprises 10-30 wt % biomass and 90-70 wt. % oil; more preferably 15-28 wt. % biomass and 85-72 wt. % oil.

The coating is applied to the fertilizer via conventional techniques, such as spraying the biomass composition on the fertilizer (or animal feed) particles in rotating drum or coating pan.

The coating preferably, has a moisture content of less than 5 wt % relative to the total weight of the coating composition. More preferably the moisture content is less than 3 wt % and even more preferably less than 1 wt % relative to the total weight of the coating composition. Preferably, the majority of the water is stabilized, such that it is not available to be transferred between coated particles. For example, the moisture may be bound within the solid biomass or contained by a hydrophobic oil or wax barrier.

It is also possible to use certain types of the coated fertilizer according to the invention, for instance coated urea particles, as cattle feed instead of as a fertilizer.

In a forth embodiment of the present invention, there is provided a process for the production of a biomass composition as previously described, comprising the steps of:
a. dispersing the biomass solid particles in a dispersant;
b. grinding an initial biomass composition until the solid particles have a $D_{50}$ between 0 and 250 µm.

The dispersant is preferably a natural oil and more preferably an plant derived oil, such as rapeseed. The oil is preferably crude vegetable oil, which may have been optionally degummed and/or de-wintered. The process may comprise the further step of adding more than 0 wt % to less than 80 wt % of a component from a waste oilseed processing stream. For example, a waste stream rich in wax may be added, to increase the wax content of the composition.

In another special embodiment of the present invention, there is provided a biomass composition for coating on a fertilizer particle or animal feed particle comprising, relative to the total dry weight of the composition:
a. 5-35 dry wt. % biomass solid particles with a $D_{50}$ between 0 and 250 µm;
b. 95-65 dry wt. % dispersant, and
c. 0.1-10 dry wt % phospholipids.
wherein, the dispersant comprises an oil, fat or wax or combination thereof.

The phospholipids (or other suitable amphiphilic compound) and the biomass solid particles combine to form an even distribution of biomass solid particles within the dispersant.

The invention will hereafter be explained in more detail in the examples without being limited thereto.

EXAMPLES

Methodology

Determination of and $D_{50}$ and $D_{90}$

The particle size of the biomass was determined according to ISO 13320-1.

The particle size of the fertilizer was determined according to ISO-DIS 8397 and ISO 565. The $D_{50}$ is the theoretical sieve opening, having such a mesh size that 50 wt % of the fertilizer or animal feed particles is larger and 50 wt % of the fertilizer or animal feed particles is smaller than this mesh size. The $D_{90}$ is determined in an analogous way.

Determination of Caking Tendency

The caking test was performed as follows:
- a cylindrical sample holder is filled with 100-200 g of material. The sample holder is made of a flexible rubber membrane;
- the sample holder is closed with a lid that is attached to the flexible membrane;
- the sample holder is put upside down and is placed in a pressure chamber;
- because of the flexible membrane pressure can be applied on the sample by applying an overpressure in the chamber the sample is compressed;
- the sample is stored at room temperature during 1 day at an overpressure of 0.1 MPa;
- after storage the overpressure was released and, within 24 hours, the caked samples are broken by means of a tensile/consolidating bench. This is done by lowering a piston on the sample holder and recording the stress needed to break the sample. The maximum value recorded is the caking tendency expressed in MPa (i.e. the maximum force divided by the top surface of the sample holder with a diameter of 40 mm).

The value for the caking tendency preferably is below 0.08 MPa, more preferably below 0.05 MPa and most preferably below 0.025 MPa.

Phospholipid content was determined in accordance with AOCS Ca12-55 using a phosphorus to phospholipid conversion factor of 30.

Wax content was determined in accordance with AOCS Ch 8-02.

Acid value was determined in accordance with Test method: AOCS Cd3a-63

Product List

Fertilizer

Calcium Ammonium Nitrate (CAN 27, Nutramon) a standard nitrogen fertilizer of DSM Agro, the Netherlands with a $D_{50}$ of 3.6 mm.

Biomass

Meal (including hulls) of de-oiled rapeseeds having a moisture content of about 10 wt. % relative to the total weight of the meal obtained from Cooperatie Carnola, the Netherlands.

Wheat flour having a $D_{50}$ of 19 μm and a $D_{90}$ of 30 μm and a moisture content of about 10 wt % relative to the total weight of the wheat flour.

Yeast cell walls (Yeast) having a $D_{50}$ of 8 μm and a $D_{90}$ of 12 μm available under the trade name Celltex® in suspension form; obtained from DSM Food Specialties Delft, The Netherlands Oil Cold pressed (C.P) rapeseed (canola) oil obtained from Cooperatie Carnola, the Netherlands containing about 0.2 wt % wax and a phospholipid content of about 0.2 wt % and an acid value of 3.15 KOH/g.

Refined and deodorized (R&D) canola oil having both a phospholipid and wax content of less than 0.1 wt. % and an acid value of 0.22 mg KOH/g.

Refined and deodorized soy bean oil having both a phospholipid and wax content of less than 0.1 wt. % and an acid value of 0.02 mg KOH/g.

Talcum

Talcum Luzenac 2S of Talc de Luzenac with a D50 particle size of about 17 μm.

Additive

Fatty Amine, NovoFlow 5019 available from Holland Novochem B.V.

Milling and Homogenizing Equipment

Pinn mill: Pallman PXL 18 (P)

Rotor-stator mixer: Ultraturrax of IKA Labortechnik, type T50 with standard dispersing tool GM (U)

Preparation of the Coated Fertilizer

The biomass was dispersed in oil, and optionally fatty amine, by using a pin mill and a rotor-stator mixer to prepare the biomass composition.

The biomass composition was heated to 60° C. and was added dropwise to or sprayed onto 1.5 kg of fertilizer particles that were kept moving in a rotating drum (35 rpm, diameter 25 cm, length 15 cm) at a temperature of 35° C. If present according to the example or experiment, two minutes after addition of the biomass composition to the fertilizer particles talcum was added. Thereafter, the fertilizer was rotated for two more minutes. The sample was released from the rotating drum and was stored to cool down to room temperature. Fertilizer particles were obtained comprising a coating comprising a biomass composition and, possibly, talcum.

The caking tendency (MPa) of uncoated fertilizer particles was also determined. (Comparative experiment A). Comparative experiment B and C use water as a dispersant.

Examples 17 to 22 relates to fertilizer prepared and coated according to example 5 (example 17 is the same as example 5), but with the dispersant containing varying degrees of mineral oil.

Table 1 and 2 illustrates that the biomass coating under the scope of the present invention results in improved anti-caking properties compared to uncoated fertilizers or coated fertilizers using an aqueous dispersant.

Table 1 also indicates that:

The cold pressed canola oil has improved anti-caking performance compared to R&D canola oil (Examples 4 & 5).

An increased % wt. coating improves anti-caking performance (examples 6 & 7);

Increased fatty amine content increases anti-caking performance (example 7 to 10);

Increased talc content increases anti-caking performance (example 11 & 12);

Increased biomass in the coating increases anti-caking performance (examples 13 to 15); and Oil is a better dispersant than water in terms of anti-caking performance (examples 9, 16, comparative experiments B & C).

Table 3 illustrates that the combination of mineral oil and natural oil (R&D canola oil) exhibits a synergistic effect in respect to reduced caking tendency.

Unless otherwise stated, reference to canola oil or soy oil is a referenced to the R&D form thereof.

Canola oil, rape oil and rapeseed oil may be interchangeably used.

Soy oil and soybean oil may be interchangeably used.

The coating weight % is expressed in terms of the total weight of the biomass coating and fertilizer.

Unless otherwise stated, % wt of a biomass component is expressed relative to the total dry weight of the biomass composition (e.g wheat flour in the tables are expressed on a dry basis).

In the tables 1 & 2, the balance (% wt) of the biomass coating is the dispersant.

TABLE 1

Examples 1 to 14

| Example | Biomass | Dispersant | Coating (wt. %) | Biomass In Coating (wt. %) | $D_{50}$ Biomass (μm) | $D_{90}$ Biomass (μm) | Fatty amine (wt. %) | Talcum (wt. %) | Caking Tendency (MPa) |
|---|---|---|---|---|---|---|---|---|---|
| 1 | Rapeseed meal | C.P canola oil | 0.10 | 25 | 170 | 299 | — | 0.3 | 0.056 |
| 2 | Rapeseed meal | C.P canola oil | 0.15 | 25 | 170 | 299 | — | 0.3 | 0.037 |
| 3 | Rapeseed meal | C.P canola oil | 0.20 | 25 | 170 | 299 | — | 0.3 | 0.034 |
| 4 | Wheat flour | C.P canola oil | 0.18 | 30 | 19 | 30 | 4.4 | 0.5 | 0.008 |
| 5 | Wheat flour | canola oil | 0.18 | 30 | 19 | 30 | 4.4 | 0.5 | 0.018 |
| 6 | Wheat flour | canola oil | 0.10 | 35 | 19 | 30 | 4.4 | 0.3 | 0.051 |
| 7 | Wheat flour | canola oil | 0.20 | 35 | 19 | 30 | 4.4 | 0.3 | 0.032 |
| 8 | Wheat flour | canola oil | 0.18 | 25 | 19 | 30 | — | 0.3 | 0.053 |
| 9 | Wheat flour | canola oil | 0.18 | 25 | 19 | 30 | 4.4 | 0.3 | 0.047 |
| 10 | Wheat flour | canola oil | 0.18 | 25 | 19 | 30 | 6.6 | 0.3 | 0.043 |
| 11 | Wheat flour | canola oil | 0.18 | 30 | 19 | 30 | 4.4 | 0.3 | 0.037 |

TABLE 1-continued

Examples 1 to 14

| Example | Biomass | Dispersant | Coating (wt. %) | Biomass In Coating (wt. %) | $D_{50}$ Biomass (μm) | $D_{90}$ Biomass (μm) | Fatty amine (wt. %) | Talcum (wt. %) | Caking Tendency (MPa) |
|---|---|---|---|---|---|---|---|---|---|
| 12 | Wheat flour | canola oil | 0.18 | 30 | 19 | 30 | 4.4 | 0.5 | 0.023 |
| 13 | Wheat flour | soy oil | 0.18 | 25 | 19 | 30 | 4.4 | 0.3 | 0.027 |
| 14 | Wheat flour | soy oil | 0.18 | 30 | 19 | 30 | 4.4 | 0.3 | 0.025 |

TABLE 2

Examples 12, 16 and Comparative Experiments A to C

| Example | Biomass | Dispersant | Coating (wt. %) | Biomass In Coating (wt. %) | D50 Biomass (μm) | D90 Biomass (μm) | Fatty amine (wt. %) | Talcum (wt. %) | Caking Tendency (MPa) |
|---|---|---|---|---|---|---|---|---|---|
| 15 | Wheat flour | soy oil | 0.18 | 35 | 19 | 30 | 4.4 | 0.3 | 0.017 |
| 16 | Yeast | canola oil | 0.18 | 25 | 8 | 12 | 4.4 | 0.5 | 0.012 |
| A | — | — | — | — | — | — | — | — | 0.256 |
| B | Wheat flour | water | 0.18 | 25 | 19 | 30 | 4.4 | 0.3 | 0.073 |
| C | Yeast | water | 0.18 | 25 | 8 | 12 | 4.4 | 0.5 | 0.045 |

TABLE 3

Examples 17 to 22

| | | mineral oil (wt. % of dispersant) | Canola oil (wt. % of dispersant) | Caking Tendency (MPa) |
|---|---|---|---|---|
| 17 | Wheat Flour | 0 | 100 | 0.018 |
| 18 | Wheat Flour | 10 | 90 | 0.013 |
| 19 | Wheat Flour | 30 | 70 | 0.010 |
| 20 | Wheat Flour | 50 | 50 | 0.008 |
| 21 | Wheat Flour | 90 | 10 | 0.011 |
| 22 | Wheat Flour | 100 | 0 | 0.012 |

The invention claimed is:

1. A biomass composition for coating on a fertilizer particle or animal feed particle comprising, relative to the total dry weight of the composition:
   (a) 5-35 dry wt. % biomass solid particles with a $D_{50}$ between 0 and 250 μm and a $D_{90}$ of less than 400 μm; and
   (b) 95-65 dry wt. % dispersant, wherein
   the dispersant comprises an oil, fat or wax or combination thereof, and wherein the biomass solid particles comprise plant derived solid particles of oilseed meal.

2. The biomass composition according to claim 1, wherein the dispersant has an acid value of less than 10 mg KOH/g.

3. The biomass composition according to claim 2, wherein the dispersant has an acid value of less than 0.1 mg KOH/g.

4. The biomass composition according to claim 1, wherein the dispersant comprises natural oil, natural fat or natural wax.

5. The biomass composition according to claim 4, wherein the natural oil is a plant derived oil.

6. The biomass composition according to claim 4, wherein the natural oil is a cold pressed oil.

7. A biomass composition for coating on a fertilizer particle or animal feed particle comprising, relative to the total dry weight of the composition:
   (a) 5-35 dry wt. % biomass solid particles with a $D_{50}$ between 0 and 250 μm and a $D_{90}$ of less than 400 μm; and
   (b) 95-65 dry wt. % dispersant, wherein
   the dispersant comprises an oil, fat or wax or combination thereof, and wherein more than 0 wt % to less than 80 wt % of the total weight of the biomass solid particles is derived from one or more oilseed waste processing streams.

8. The biomass composition according to claim 1, wherein the dispersant comprises:
   (i) greater than 75 wt % to less than 99.9 wt % oil or fat;
   (ii) greater than 0.1 wt % to less than 25 wt % wax; and
   (iii) greater than 0.1 wt % to less than 10 wt % phospholipids.

9. The biomass composition according to claim 1, wherein the biomass solid particles further comprise solid particles of biomass derived from at least one of the group consisting of yeast cells, bacteria cells, fungi cells, and waste water sludge resulting from the treatment of organic or biologic waste.

10. A coated fertilizer comprising fertilizer particles coated with the biomass composition according to claim 1.

11. The coated fertilizer according to claim 10, comprising 0.001-10 wt. % biomass composition based on the total weight of the fertilizer.

12. A coated animal feed comprising feed particles coated with the biomass composition according to claim 1.

13. The coated animal feed according to claim 12, comprising 0.001-10 wt. % biomass composition based on the total weight of the animal feed.

14. A process for the production of a biomass composition according to claim 1, comprising the steps of:
   (a) dispersing the biomass solid particles in the dispersant; and
   (b) grinding an initial biomass composition until the solid particles have a $D_{50}$ between 0 and 250 μm, wherein the initial biomass composition comprises solid particles with a $D_{50}$ between 100 and 5000 μm and comprises at most 25 wt % water, relative to the weight of the total initial biomass composition.

* * * * *

UNITED STATES PATENT AND TRADEMARK OFFICE
CERTIFICATE OF CORRECTION

PATENT NO. : 8,506,671 B2  
APPLICATION NO. : 12/747361  
DATED : August 13, 2013  
INVENTOR(S) : Schaafsma et al.

Page 1 of 1

It is certified that error appears in the above-identified patent and that said Letters Patent is hereby corrected as shown below:

Title page, item (75) Inventors should read as follows:

Stefan Hendrikus Schaafsma, Sittard (NL);

Richard Johannes Matheus Janssen, Geleen (NL);

Theodorus Marie Leopold Evers, Born (NL)

Signed and Sealed this
Twenty-fourth Day of December, 2013

Margaret A. Focarino
*Commissioner for Patents of the United States Patent and Trademark Office*